United States Patent [19]

Dighton et al.

[11] Patent Number: 4,595,620
[45] Date of Patent: Jun. 17, 1986

[54] DEAD-FOLDED ARTICLES FROM FIBER-REINFORCED PLASTICS

[75] Inventors: Gaylon L. Dighton; Jane K. McLemore, both of Baton Rouge, La.

[73] Assignee: The Dow Chemical Company, Midland, Mich.

[21] Appl. No.: 633,735

[22] Filed: Jul. 23, 1984

[51] Int. Cl.$^4$ .............................................. B32B 3/04
[52] U.S. Cl. .................................... 428/121; 428/35; 428/325; 428/359; 428/362; 428/366; 428/367; 428/412; 428/430; 428/440; 493/901; 493/916
[58] Field of Search ............... 428/325, 441, 359, 366, 428/367, 412, 430, 440, 362, 35, 121

[56] References Cited

U.S. PATENT DOCUMENTS

| | | | |
|---|---|---|---|
| 3,437,550 | 4/1969 | Paul, Jr. .............................. | 428/441 |
| 4,262,051 | 4/1981 | Welz et al. ........................ | 428/325 |
| 4,318,960 | 3/1982 | McCombs et al. ................. | 428/441 |
| 4,454,192 | 6/1984 | Suzuki ............................... | 428/441 |
| 4,500,603 | 2/1985 | Freundlich ......................... | 428/441 |

*Primary Examiner*—Jacob Ziegler

[57] ABSTRACT

Dead-folded articles are disclosed which comprise a dead-foldable fiber reinforced plastic sheet. Said sheet has a thickness from about 1 to 50 mils. The reinforcing fibers in the sheet are short and randomly oriented in two dimensions within said sheet.

7 Claims, No Drawings

DEAD-FOLDED ARTICLES FROM FIBER-REINFORCED PLASTICS

BACKGROUND OF THE INVENTION

This invention relates to dead-folded plastic articles, more particularly to dead-folded articles of a fiber-reinforced plastic.

Paper and cardboard are currently used as containers for liquid and solvent materials, as light weight carriers such as for soft drink bottles and for many other similar articles.

Cardboard and cardboard materials have several disadvantages when used in such applications. For example, when wetted, paper and cardboard rapidly lose their strength. Even when not wetted, paper and cardboard materials are readily susceptible to tears and general wear and, therefore, do not have a useful life which is as long as desired.

It has therefore been attempted to substitute plastic materials for paper and cardboard in such applications.

However, plastic materials have not been found to be entirely satisfactory. Generally, plastic materials which are thin enough to substitute for paper or cardboard are not strong enough for the intended use. This is particularly true when the article is required to be load bearing as in a soft drink bottle carrier. Another problem is that plastic materials heretofore have not possessed the ability to be dead-folded, that is to remain in a folded position after folding and creasing.

It would therefore be advantageous to provide a plastic article having improved physical physical properties and the ability to be dead-folded.

SUMMARY OF THE INVENTION

This invention is such a dead-folded article.

This invention is an article of manufacture comprising a dead-folded plastic sheet, wherein said sheet comprises a continuous matrix comprising a thermoplastic resin having imbedded therein from about 10 to 50 percent by weight of the sheet of reinforcing fibers. These fibers have an average length of about 1/16 to about 1 inch (1.5-25 mm) and are randomly oriented in two dimensions substantially in the plane defined by said sheet. The sheet of this invention has a thickness from about 1 to about 50 mils (0.02-1 mm).

The article of this invention exhibits high tensile strength due to the presence and arrangement of the reinforcing fibers. Surprisingly, however, when such a fiber-reinforced sheet is employed, the article is readily dead-folded and is therefore useful in the preparation of folded articles such as containers for liquids and solids and carriers such as for soft drink bottles, and other applications in which a folded, structural material is required.

DETAILED DESCRIPTION OF THE INVENTION

The article of manufacture of this invention comprises a dead-folded plastic sheet from about 1 to 50 mils (0.02-1 mm) thick. The plastic sheet comprises a continuous matrix comprising a thermoplastic resin having imbedded therein from about 10 to 50 percent by weight of the sheet of reinforcing fibers. The reinforcing fibers are substantially unbroken, have an average length from about 1/16 to 1 inch (1.5-25 cm) and are randomly oriented substantially in the plane defined by said sheet.

The thermoplastic resin used herein can be any thermoplastic resin which is solid at ambient temperature and into which the reinforcing fibers can be incorporated.

Due to the preferred method in which the plastic sheet is prepared, it is generally preferable that the resin be water-insoluble and capable of being prepared as a fine particulate.

Suitable such resin include, for example, polyolefins such as polyethylene, ultra-high molecular weight polyethylene, high density polyethylene, linear low density polyethylene, polypropylene and the like; chlorinated polyethylene; polycarbonates; ethylene/acrylic acid copolymers; polyamides such as nylon 6, nylon 6,6 and the like; phenylene oxide resins; phenylene sulfide resins; polyoxymethylenes; polyesters; the so-called ABS (acrylonitrile/butadiene/styrene/resins; polyvinyl chloride; vinylidene chloride/vinylchloride resins; and vinyl aromatic resins such as polystyrene, polyvinyl naphthalene, polyvinyl toluene and the like.

Although any of these resins are suitable herein, the particular choice of resin may depend somewhat on the particular requirements of the application for which the dead-folded article is to be used. For example, properties such as impact resistance, tensile strength, heat distortion temperature, barrier characteristics and the like are all effected by the choice of polymer. For most applications, however, polyolefins, vinyl aromatic resins, and vinyldiene chloride/vinyl chloride copolymers are preferred due to the relatively low cost and generally good properties.

The resin forms a continuous matrix into which the reinforcing fibers are dispersed. The reinforcing fibers are randomly dispersed into said continuous matrix as further described hereinafter.

The reinforcing fibers usually employed herein include mineral fibers such as glass, carbon, ceramic, boron and the like; metallic fibers; fibers of organic polymers having a high melting point such as aromatic polyamides, including the so-called aramid fibers, polybenzimide, polybenzoxazol, polybenzothiazol, polyesters and the like; cellulosic fibers and other fibers known to be useful as reinforcing agents for resinous materials. Of the foregoing, glass fibers are of particular interest due to their relatively low cost, high availability and excellent physical properties. Mixtures of the foregoing fibers are of course suitable herein.

Preferably, the fibers have a diameter from about 0.0001 to about 0.01 inch (0.25 to 25 microns (i.e., those having diameters commonly designated as B to U inclusive)). Preferably the glass fibers have a diameter from about 0.00025 to 0.00075 inches (i.e., diameter is designated as E to P inclusive).

Said fibers are randomly oriented in the continuous matrix in two dimensions substantially in the plane parallel to that defined by the sheet. The average length of said fibers is from about 1/16 to about 1 inch (1.5 to 25 mm). Said fibers advantageously comprise from about 10 to about 50, preferably about 20 to about 40 percent by weight of the plastic sheet.

The fibers employed in this invention may, if desired, be "sized", i.e., treated or coated to render them more compatible with thermoplastic resin. Said sizing is generally a starch/oil emulsion or a mixture of an organic resin film former, a wetting agent and surfactant wherein the surfactant is commonly a methacrylatochromic chloride complex or any of a variety of silicone coupling agents which are well known in the art.

In addition to the foregoing components, various optional components are also advantageously present in the plastic sheet used in this invention. In the preferred method for making said plastic sheet, it is generally necessary to employ a polymeric binder. According, the resulting sheet made using this process generally contains said polymeric binder. Suitable binders include polymeric latexes of substantially water-insoluble organic polymers having bound anionic or cationic charges such as acrylic or styrene/butadiene polymers containing bound sulfonium, sulfoxonium, isothioronium, pyridinium, quaternary ammonium, sulfate, sulfonate or carboxylate groups. Latex binders which are suitable for use in said preferred method are described in greater detail in U.S. Pat. No. 4,426,470, which is hereby incorporated by reference.

In addition, starch, particularly starch which contains linear polymers such as natural starch or corn starch as well as enzymatically or chemically modified starch is suitable as a binder in said preferred method and the plastic sheet used in this invention can contain said starch in the resin matrix.

In addition, said preferred process usually requires the use of an organic flocculant. Accordingly, the plastic sheet of this invention, prepared by said process generally further comprises the solids of said flocculant. Suitable flocculants include aluminum polychloride (aluminum hydroxy chloride) or diverse organic flocculants such as partially hydrolyzed polyacryllamide and modified cationic polyacrylamide, and diallyldiethylammonium chloride. Said flocculant is typically present in relatively small amounts (i.e., less than about 5, preferably less than about 3 percent) by weight of the plastic sheet used in this invention.

The plastic sheet used in this invention may also optionally contain minor amounts of a filler such as silicon dioxide, calcium cabonate, magnesium oxide, calcium silicate and mica. Pigments or dyes may also be added to impart opacity and/or color. Various chemical additives such as anionic oxidents, UV stabilizers, thickeners, filming agents, anti-foaming agents, bacteriocides, crosslinking agents such as dicumyl peroxide and azobisformamide, and the like may also be used.

The plastic sheet used in this invention, is advantageously prepared in a paper-making process as described in U.S. Pat. No. 4,426,470 and in European Patent Publication No. 81/00268. In such process dilute aqueous slurry of finely divided resin particles, reinforcing fibers, and binder (and optionally other fillers) is prepared. The slurry is then floccuated with the flocculating agent, causing the flocculated solids to form into a sheet or web which is then dewatered and dried such as by air drying at ambient conditions or oven drying. The dried sheet is densified by heating the sheet above the softening temperature of the continuous polymer matrix and compressing the softened matrix as with a flat press calendering rolls or other suitable equipment. The resulting densified sheet or web is advantageously from about 1 to about 50 mils thick. If desired, two or more such sheets may be thermally welded together by the application of heat and pressure to form a slightly thicker plastic sheet. Preferably, the overall thickness of the plastic sheet used to make the article of this invention is from about 1 to about 50, preferably about 5 to about 25 mils.

The term "densified", as employed herein, it is meant that the plastic sheet has a void volume which is less than 20 percent, preferably less than 15 percent of the volume of the sheet. Such densified materials typically have a density from about 0.8 to 1.25 grams per cubic centimeter.

The article of this invention is prepared by dead-folding the plastic sheet into the desired configuration. Generally, dead-folding is accomplished by the folding the sheet into desired position and creasing said fold. The term "dead-fold" as used herein means that the article, when folded and creased, remains substantially in said folded position, and there are substantially no tears, breakages or other discontinuities visually present at the fold.

Said dead-folding can generally be accomplished in conventional manner using conventional equipment as is used for dead-folding paper and cardboard of similar thickness. Creasing is accomplished by use of a scoring or creasing roll or equipment.

Corrugated articles of this invention are also readily prepared using conventional methods and equipment as used in preparing corrugated paperboards. A central corrugated layer is formed by passing a thin layer of plastic sheet as described hereinbefore between two fluted metal rolls thereby dead-folding the sheet to form a corrugated layer. This corrugated layer is then encased by means of a glue layer or by thermowelding on both sides with facings of flat layers of plastic sheets. Double or triple walled corrugated articles can also be prepared in conventional manner. The article of this invention may be in the form of corrugated in the solid fiber boxes, folding cartons, set-up boxes, fiber cans and tubes, soft drink carriers as well as many other diverse shapes. Where it is required to fasten the plastic sheet to itself in the formation of said article, such fastening may be done by the use of staples, rivets, thermowelding or gluing the sheets together. Suitable adhesives include ethylene/acrylic acid copolymers, ethyl/vinyl acetate copolymers, styrene/butadiene block copolymers, phenoxy resins and other conventional adhesives.

The following examples are provided to illustrate the invention, but not limit the scope thereof. All parts and percentages are by weight unless otherwise indicated.

EXAMPLE 1

A 6 mil (0.15 mm) thick sheet of a polypropylene (Hercules 6323) resin containing 40 percent by weight randomly oriented ½ inch (13 mm) glass fibers (13μ diameter) is prepared and densified according to the general procedures described in U.S. Pat. No. 4,426,470. The sheet has a density of 1.24 g/cc. The ability of this sheet to dead-fold is tested by manually creasing the sheet. The sample passes when it holds the fold and the fold is free of tears, breaks, or obvious signs of fiber breakage on visual inspection.

A 10 mil (0.25 mm) thick sheet of like composition also passes the foregoing test.

EXAMPLE 2

A 12 mil (0.3 mm) sheet of a 6.0 melt index high density polyethylene resin containing 31 percent by weight randomly oriented 1/16 inch (1.5 mm) glass fibers (13μ diameter) is prepared and densified according to the general procedure described in U.S. Pat. No. 4,426,470.

This sheet has a density of 1.0 g/cc and passes the dead-fold test described in Example 1.

A similar 34 mil (0.85 mm) sheet (0.8 g/cc density) exhibits cracking at the fold in the dead-folding test. However, the sheet is successfully run through a commercial corrugation machine with no tearing or fiber breakage. The resulting corrugated sheet has corrugations 2 mm in height.

What is claimed is:

1. An article of manufacture comprising a dead-folded plastic sheet wherein said sheet comprises a densified continuous matrix prepared from a dilute aqueous slurry comprising a thermoplastic resin, said matrix having imbedded therein from about 10 to 50 percent by weight of the sheet of reinforcing fibers having an average length from about 0.06 to 1 inch, which fibers are randomly oriented in two dimensions substantially in the plane defined by said sheet and wherein said sheet is from about 1 to about 50 mils thick.

2. The article of manufacture of claim 1 wherein said thermoplastic resin is a polyolefin.

3. The article of manufacture of claim 1 wherein said thermplastic resin is a polyvinyl aromatic.

4. the article of manufacture of claim 1 wherein said thermoplastic resin is a copolymer of vinylidene chloride.

5. The article of manufacture of claim 1 wherein said thermoplastic resin is a polymer of vinyl chloride.

6. The article of manufacture of claim 1 wherein said reinforcing fiber comprises glass fibers.

7. The article of manufacture of claim 1 wherein said continuous matrix further comprises a polymeric binder in the solids of a flocculating agent.

* * * * *